US 6,619,394 B2

(12) United States Patent
Soliman et al.

(10) Patent No.: US 6,619,394 B2
(45) Date of Patent: Sep. 16, 2003

(54) METHOD AND APPARATUS FOR TREATING A WELLBORE WITH VIBRATORY WAVES TO REMOVE PARTICLES THEREFROM

(75) Inventors: Mohamed Y. Soliman, Plano, TX (US); Ali I. Mese, Houston, TX (US); Clark E. Robison, Tomball, TX (US); James R. Birchak, Spring, TX (US); Paul F. Rodney, Spring, TX (US); Wei Han, Missouri City, TX (US); Vimal V. Shah, Houston, TX (US); Eugene J. Linyaev, Houston, TX (US); Mark A. Proett, Missouri, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 21 days.

(21) Appl. No.: 09/731,873

(22) Filed: Dec. 7, 2000

(65) Prior Publication Data

US 2002/0070017 A1 Jun. 13, 2002

(51) Int. Cl.⁷ .......................... E21B 28/00; E21B 43/00; H02K 5/12; H01L 41/08
(52) U.S. Cl. ................. 166/249; 166/177.6; 166/177.7; 310/87; 310/321; 310/337
(58) Field of Search .............................. 166/249, 254.2, 166/250.02, 250.05, 177.6, 177.7; 310/334, 321, 337, 87

(56) References Cited

U.S. PATENT DOCUMENTS

| | | | |
|---|---|---|---|
| 2,700,422 A | * 1/1955 | Bodine, Jr. ............... 166/177.1 |
| 2,871,943 A | * 2/1959 | Bodine, Jr. ............... 166/177.1 |
| 3,113,621 A | * 12/1963 | Krugeger et al. ......... 166/177.7 |
| 3,189,536 A | 6/1965 | Bodine ........................ 208/11 |
| 3,322,196 A | * 5/1967 | Bodine, Jr. ............... 166/177.1 |
| 3,384,188 A | 5/1968 | Bodine, Jr. .................. 175/55 |
| 3,416,487 A | * 12/1968 | Greene ........................ 166/249 |
| 3,527,300 A | * 9/1970 | Phillips ..................... 166/177.6 |
| 3,578,081 A | * 5/1971 | Bodine ..................... 166/177.2 |
| 3,583,677 A | * 6/1971 | Phillips ..................... 166/177.7 |
| 3,648,769 A | 3/1972 | Sawyer ........................ 166/177 |
| 3,730,269 A | 5/1973 | Galle ........................ 166/177 |
| 3,850,135 A | * 11/1974 | Galle ........................ 166/249 |
| 3,952,800 A | 4/1976 | Bodine ........................ 166/249 |
| 3,970,146 A | 7/1976 | Keenan, Jr. .................. 166/249 |
| 3,990,512 A | * 11/1976 | Kuris ....................... 166/177.1 |
| 4,022,275 A | 5/1977 | Brandon ..................... 166/249 |
| 4,023,628 A | 5/1977 | Bodine ........................ 175/56 |
| 4,026,481 A | 5/1977 | Bodine ........................ 241/266 |

(List continued on next page.)

OTHER PUBLICATIONS

U.S. patent application Ser. No. 09/464,728, filed Dec. 16, 1999.
Case Histories, www.vortech–inc.com, printed Apr. 23, 2001, pp. 1–52.

(List continued on next page.)

Primary Examiner—David Bagnell
Assistant Examiner—Jennifer H Gay
(74) Attorney, Agent, or Firm—John W. Wustenberg; Paul I. Herman; Rodney B. Carroll

(57) ABSTRACT

A process and apparatus for treating a wellbore, comprising subjecting a substantially same portion of the wellbore to vibratory waves produced by a plurality of vibratory wave generators. The vibratory waves may have about the same frequency or a plurality of frequencies, and the frequencies may partially overlap, not overlap, or be modulated across a range. Additionally, the frequencies may be modulated in an oval, hoop, and flexural modes. The vibratory waves may be produced by firing the vibratory wave generators simultaneously or in sequence. Combinations of a vibrating pipe, piston pulser, or valve may be used as vibratory wave generators. In a preferred embodiment, the thickness and change of thickness of a mudcake on the interior surface of a wellbore are measured to evaluate the effectiveness of the wellbore treatment.

66 Claims, 4 Drawing Sheets

U.S. PATENT DOCUMENTS

| | | | |
|---|---|---|---|
| 4,096,762 A | 6/1978 | Bodine | 74/61 |
| 4,156,470 A | 5/1979 | Bodine et al. | 175/313 |
| 4,166,034 A | 8/1979 | Bodine | 210/67 |
| 4,218,849 A | 8/1980 | Bodine | 51/7 |
| 4,223,749 A | 9/1980 | Bodine et al. | 175/227 |
| 4,236,580 A | 12/1980 | Bodine | 166/301 |
| 4,252,189 A | 2/1981 | Bodine | 166/249 |
| 4,256,190 A | 3/1981 | Bodine | 175/56 |
| 4,257,482 A | 3/1981 | Kompanek | 166/249 |
| 4,257,648 A | 3/1981 | Bodine | 299/37 |
| 4,261,425 A | 4/1981 | Bodine | 175/106 |
| 4,265,129 A | 5/1981 | Bodine | 74/61 |
| 4,266,619 A | 5/1981 | Bodine | 175/55 |
| 4,271,915 A | 6/1981 | Bodine | 175/56 |
| 4,280,557 A | 7/1981 | Bodine | 166/177 |
| 4,280,558 A | 7/1981 | Bodine | 166/245 |
| 4,299,279 A | 11/1981 | Bodine | 166/72 |
| 4,323,119 A | 4/1982 | Bodine | 166/177 |
| 4,323,364 A | 4/1982 | Scherz | 23/230 |
| 4,337,158 A | 6/1982 | Bodine | 210/785 |
| 4,342,364 A | 8/1982 | Bodine | 166/249 |
| 4,358,248 A | 11/1982 | Bodine | 417/53 |
| 4,366,988 A | 1/1983 | Bodine | 299/14 |
| 4,393,932 A | 7/1983 | Bodine | 166/249 |
| 4,403,665 A | 9/1983 | Bodine | 175/55 |
| 4,429,743 A | 2/1984 | Bodine | 166/177 |
| 4,434,944 A | 3/1984 | Bodine | 241/258 |
| 4,436,452 A | 3/1984 | Bodine | 405/232 |
| 4,446,933 A | 5/1984 | Bodine | 175/229 |
| 4,469,175 A | 9/1984 | Massa | 166/249 |
| 4,471,838 A | 9/1984 | Bodine | 166/249 |
| 4,487,554 A | 12/1984 | Bodine | 417/241 |
| 4,512,401 A | 4/1985 | Bodine | 166/249 |
| 4,512,402 A | 4/1985 | Kompanek et al. | 166/249 |
| 4,522,271 A | 6/1985 | Bodine | 175/56 |
| 4,527,637 A | 7/1985 | Bodine | 175/55 |
| 4,544,031 A | 10/1985 | Bodine | 166/177 |
| 4,548,281 A | 10/1985 | Bodine | 175/55 |
| 4,566,800 A | 1/1986 | Bodine | 366/118 |
| 4,615,400 A | 10/1986 | Bodine | 175/55 |
| 4,629,135 A | 12/1986 | Bodine | 241/201 |
| 4,640,360 A | 2/1987 | Bodine et al. | 166/286 |
| 4,645,017 A | 2/1987 | Bodine | 173/162 |
| 4,648,449 A | 3/1987 | Harrison | 166/249 |
| 4,652,309 A | 3/1987 | Bodine | 75/101 |
| 4,653,587 A | 3/1987 | Bodine | 166/286 |
| 4,658,897 A | 4/1987 | Kompanek et al. | 166/249 |
| 4,662,459 A | 5/1987 | Bodine | 175/56 |
| 4,665,980 A | 5/1987 | Bodine | 166/249 |
| 4,667,742 A | 5/1987 | Bodine | 166/301 |
| 4,673,037 A | 6/1987 | Bodine | 166/249 |
| 4,682,070 A | 7/1987 | Plambeck | 310/334 |
| 4,693,326 A | 9/1987 | Bodine | 175/55 |
| 4,695,231 A | 9/1987 | Bodine | 417/241 |
| 4,702,315 A | 10/1987 | Bodine | 166/249 |
| 4,703,207 A | 10/1987 | Bodine | 310/11 |
| 4,716,555 A | 12/1987 | Bodine | 367/35 |
| 4,736,794 A | 4/1988 | Bodine | 166/286 |
| 4,774,427 A | 9/1988 | Plambeck | 310/321 |
| 4,778,279 A | 10/1988 | Bodine | 366/118 |
| 4,780,138 A | 10/1988 | Bodine | 75/101 |
| 4,788,467 A * | 11/1988 | Plambeck | 166/177.6 |
| 4,790,393 A * | 12/1988 | Larronde et al. | 175/40 |
| 4,815,328 A | 3/1989 | Bodine | 74/87 |
| 4,817,712 A | 4/1989 | Bodine | 166/249 |
| 4,824,258 A | 4/1989 | Bodine | 366/118 |
| 4,830,758 A | 5/1989 | Bodine | 210/748 |
| 4,836,299 A | 6/1989 | Bodine | 175/22 |
| 4,848,486 A | 7/1989 | Bodine | 175/55 |
| 4,874,270 A | 10/1989 | Bodine | 405/248 |
| 4,883,532 A | 11/1989 | Bodine | 75/101 |
| 4,884,634 A | 12/1989 | Ellingsen | 166/248 |
| 4,885,098 A | 12/1989 | Bodine | 210/702 |
| 4,913,234 A | 4/1990 | Bodine | 166/301 |
| 4,945,986 A | 8/1990 | Hardin et al. | 166/249 |
| 5,030,034 A | 7/1991 | Bodine | 405/128 |
| 5,109,922 A | 5/1992 | Joseph | 166/65.1 |
| 5,122,992 A | 6/1992 | Kompanek | 367/159 |
| 5,135,051 A | 8/1992 | Facteau et al. | 166/104 |
| 5,165,438 A | 11/1992 | Facteau et al. | 137/1 |
| 5,184,678 A | 2/1993 | Fechkov et al. | 166/249 |
| 5,228,508 A | 7/1993 | Facteau et al. | 166/177 |
| 5,234,056 A | 8/1993 | Bodine et al. | 166/301 |
| 5,282,508 A | 2/1994 | Ellingsen et al. | 166/249 |
| 5,371,330 A | 12/1994 | Winbow | 181/106 |
| 5,377,753 A | 1/1995 | Haberman et al. | 166/249 |
| 5,418,335 A | 5/1995 | Winbow | 181/106 |
| 5,458,860 A | 10/1995 | Morris et al. | 423/155 |
| 5,549,170 A | 8/1996 | Barrow | 175/55 |
| 5,595,243 A | 1/1997 | Maki, Jr. et al. | 166/177.2 |
| 5,727,628 A | 3/1998 | Patzner | 166/249 |
| 5,826,653 A | 10/1998 | Rynne et al. | 166/245 |
| 5,836,389 A | 11/1998 | Wagner et al. | 166/249 |
| 5,893,383 A | 4/1999 | Facteau | 137/14 |
| 5,907,269 A | 5/1999 | Zrostlik | 335/215 |
| 5,931,452 A | 8/1999 | Nakatomi et al. | 269/216 |
| 5,984,023 A | 11/1999 | Sharma et al. | 175/50 |
| 5,984,578 A | 11/1999 | Hanesian et al. | 405/138 |
| 6,003,620 A | 12/1999 | Sharma et al. | 175/50 |
| 6,009,948 A * | 1/2000 | Flanders et al. | 166/177.2 |
| 6,012,521 A | 1/2000 | Zunkel et al. | 166/249 |
| 6,029,746 A | 2/2000 | Dodd | 166/312 |
| 6,037,682 A | 3/2000 | Shoop et al. | 310/26 |
| 6,059,031 A | 5/2000 | Brett | 166/249 |
| 6,102,152 A | 8/2000 | Masino et al. | 181/106 |
| 6,186,228 B1 * | 2/2001 | Wegener et al. | 166/177.2 |
| 6,189,618 B1 | 2/2001 | Beeman et al. | 166/312 |
| 6,227,293 B1 * | 5/2001 | Huffman et al. | 166/177.2 |
| 6,312,605 B1 * | 11/2001 | Kerfoot | 166/250.02 |
| 6,390,191 B1 | 5/2002 | Melson et al. | 166/177.1 |
| 2001/0017206 A1 * | 8/2001 | Davidson et al. | 166/249 |
| 2001/0023763 A1 * | 9/2001 | Brett | 166/249 |

OTHER PUBLICATIONS

Brochure, "Capability Statement," ETREMA, pp. 1–2 (undated).

Brochure, Etrema Products, Inc., p. 1 (undated).

Brochure, "TERFENOL–D Magnetostrictive Material," ETREMA, pp. 1–2 (undated).

Brochure, "ETREMA PowerWave™", ETREMA Products, Inc., pp. 1–2 (undated).

"New Technologies Improve Contaminant Removal Rate in Groundwater Aquifiers", Jan. 2000, ETREMA Products, Inc., pp. 1–4.

"What's Happening in Production," Perry A. Fischer, *World Oil*, May 2000, p. 1.

"Acoustic Tool Enhances Oil Production," Ted Drake & Igor Beresnev, *The American Oil & Gas Reporter*, Sep. 1999, pp. 1–4.

"Seismic Stimulation for Enhanced Production of Oil Reservoirs," Mar. 28, 2000, pp. 1–3, www.ees4.lanl.gov/stimulation/NGOTP/NGOTP–STIMULATION.HTML.

"1997 Natural Gas and Oil Technology Partnership Startup Proposal," pp. 1–3, www.ees4.lanl.gov/stimulation/NGOTP/NGOTP97_prop.HTML.

"1998 Natural Gas and Oil Technology Partnership Continuation Propasal," pp. 1–4 www.ees4.lanl.gov/stimulation/NGOTP/NGOTP98_prop.HTML.

"1999 Natural Gas and Oil Technology Partnership Continuation Proposal," pp. 1–4 Www.ees4.lanl.gov/stimulation/NGOTP/NGOTP99_prop.HTML.

"Laboratory Experimental Investigations on Enhances Fluid Flow in Porous Core Samples," pp. 1–3 www.ees4.lanl.gov/stimulation/NGOTP/STIM_LAB.HTML(undated).

"Seismic Stimulation for Enhanced Production of Oil Reservoirs," pp. 1–5 Www.ees4.lanl.gov/stimulation/NGOTP/5₋98 summary.HTML (undated).

"Seismic Stimulation for Enhanced Production of Oil Reservoirs," Feb.–Mar., 1998, p. 1 www.ees4.lanl.gov/stimulation/NGOTP/Feb–Mar98.HTML.

"Seismic Stimulation for Enhanced Production of Oil Reservoirs," Apr.–May, 1998, p. 1 www.ees4.lanl.gov/stimulation/NGOTP/Apr–May98.HTML.

"Seismic Stimulation for Enhanced Production of Oil Reservoirs," Jun.–Jul. 1998 Progress Report, p. 1 www.ees4.lanl.gov/stimulation/NGOTP/Jun.–Jul98.HTML.

"Seismic Stimulation for Enhanced Production of Oil Reservoirs," Aug.–Sep., 1998 Progress Report, p. 1 www.ees4.lanl.gov/stimulation/NGOTP/Aug–Sep98.HTML.

"Seismic Stimulation for Enhanced Production of Oil Reservoirs," Oct.–Nov., 1998 Progress Report, p. 1 www.ees4.lanl.gov/stimulation/NGOTP/Oct–Nov98.HTML.

"Seismic Stimulation for Enhanced Production of Oil Reservoirs," Dec. 1998–Jan., 1999 Progress Report, www.ees4.lanl.gov/stimulation/NGOTP/Dec–Jan99.HTML. p. 1.

"Seismic Stimulation for Enhanced Production of Oil Reservoirs," Feb.–Mar., 1999 Progress Report, p. 1 www.ees4.lanl.gob/stimulation/NGOTP/Feb–Mar99.HTML.

"Seismic Stimulation for Enhanced Production of Oil Reservoirs," Apr.–May, 1999 Progress Report, p. 1 www.ees4.lanl.gov/stimulation/NGOTP/Apr.–May99.HTML.

"Seismic Stimulation for Enhanced Production of Oil Reservoirs," Aug.–Sep., 1999 Progress Report, p. 1 www.ees4.lanl.gov/stimulation/NGOTP/Aug–Sep99.HTML.

"Seismic Stimulation for Enhanced Production of Oil Reservoirs," Oct.–Nov., 1999 Progress Report, p. 1 www.ees4.lanl.gov/stimulation/NGOTP/Oct–Nov99.HTML.

"Seismic Stimulation for Enhanced Production of Oil Reservoirs," pp. 1–30 www.ees4.lanl.gov/stimulation/ (undated).

"Seismic Stimulation of Oil Production in Depleted Reservoirs," Jul. 21, 1998, pp. 1–18 www.ees4.lanl.gov/stimulation/AEP/AEP–STIMULATION.HTML.

Brochure—Perf Clean International (undated).

"Downhole Wellbore Damage: It's Hammer Time," 3rd Quarter 1998, pp. 1–2 www.pttc.org/tech_sum/ts 084.htm.

"Sonic Savings—Two Products Pulsate Sound Waves Through Liquid for Low–Cost Wellbore Cleaning," printed May 22, 2001, pp. 1–4 www.ntm.nickles.com/Issues/2001/Feb/page11.asp.

* cited by examiner

METHOD AND APPARATUS FOR TREATING A WELLBORE WITH VIBRATORY WAVES TO REMOVE PARTICLES THEREFROM

BACKGROUND OF THE INVENTION

The present invention is a method and apparatus for treating the bore of a hydrocarbon producing well, and more specifically a method and apparatus for cleaning a wellbore and stimulating hydrocarbon production from surrounding formations by removing particles therefrom by subjecting the particles to vibratory waves produced by two or more vibratory wave generators.

An ongoing problem with hydrocarbon producing wells is maintaining flow therefrom. Over time, the interior surface of the wellbore and the pores and fractures in the producing formations tend to become clogged with particles, contaminants, scale, earthen debris and the like. Also, a hydrocarbon well typically must be serviced during its production life, which frequently requires circulation of mud in the well. An undesirable side effect of such circulation is the formation of a residual mudcake adhered to the interior surface of the wellbore that can further inhibit hydrocarbon production from the formation. The present invention solves these clogging problems by employing a plurality of vibratory wave generators to produce vibratory waves which loosen the contaminant particles from the surfaces of the formation fractures and wellbore where they can be lifted out of the well by a circulating fluid during treatment or by hydrocarbons during production.

SUMMARY OF THE INVENTION

The present invention discloses a process and apparatus for treating a wellbore, comprising subjecting a substantially same portion of the wellbore to vibratory waves produced by a plurality of vibratory wave generators. The vibratory waves may have about the same frequency or a plurality of frequencies, and the frequencies may partially overlap, not overlap, or be modulated across a range. Additionally, the frequencies may be modulated in the oval, hoop, and flexural modes. The vibratory waves may be produced by firing the vibratory wave generators simultaneously or in sequence. Preferably, the vibratory waves are acoustically streamed in a viscous boundary layer near obstacles, outside a viscous boundary layer near obstacles, or in a free non-uniform sound field. In a preferred embodiment, a vibrating pipe and a piston pulser are used as vibratory wave generators. In another preferred embodiment, a vibrating pipe, piston pulser, and a valve are used as vibratory wave generators. In another preferred embodiment, the thickness and change of thickness of a mudcake on the interior surface of a wellbore is measured to evaluate the effectiveness of the wellbore treatment. The speed of sound in the wellbore fluid is calculated. An ultrasonic signal is transmitted from a transducer, and the time of flight for an echo reflected from the boundary of the wellbore fluid and the mudcake back to the transducer is measured. At a later time in the same waveform, an echo reflected from the boundary of the mud cake and the interior surface of the wellbore back to the transducer arrives. The time of flight for this second echo is also measured. The thickness of the mudcake is calculated according to the equation $L=(T_2-T_1)*c/2$, where L is the thickness of the mudcake, c is the speed of sound in the wellbore fluid, $T_1$ is the time of flight for an echo reflected from the boundary of the wellbore fluid and the mudcake, and $T_2$ is time of flight for an echo reflected from the boundary of the mudcake and the interior surface of the wellbore. The change in thickness of the mudcake between a second point in time after a first point in time is calculated according to the equation $\Delta L=0.5*(T_{1a}*c_a-T_{1b}*c_b)$, where $\Delta L$ is the change in thickness of the mudcake, $c_a$ is the speed of sound in a wellbore fluid at the second point in time, $c_b$ is the speed of sound in the wellbore fluid at the first point in time, $T_{1a}$ is the time of flight for an echo reflected from the boundary of the wellbore fluid and the mudcake measured at the second point in time, and $T_{1b}$ is the time of flight for an echo reflected from the boundary of the wellbore fluid and the mudcake measured at the first point in time.

DETAILED DESCRIPTION OF THE INVENTION

Figure 1:
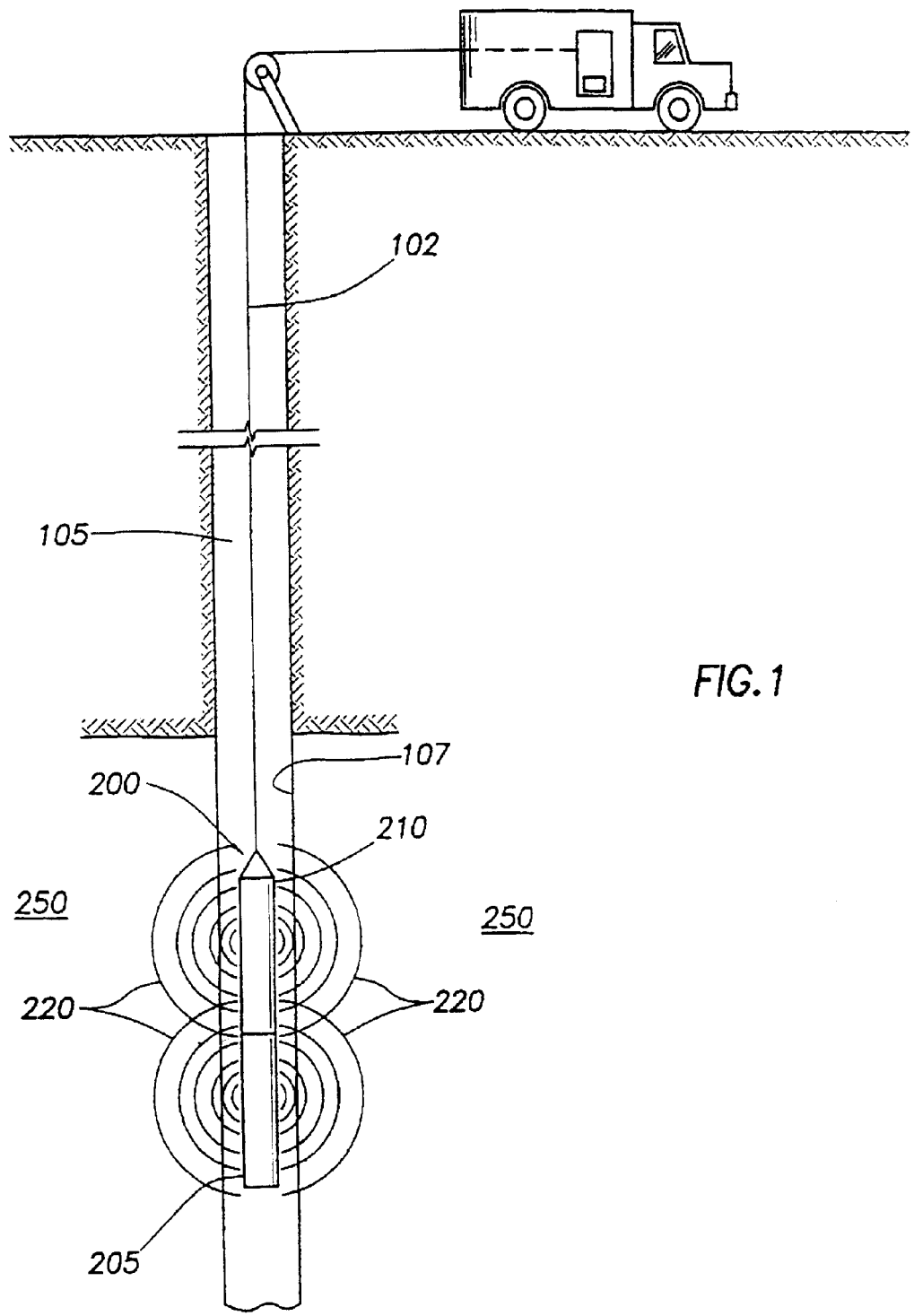
FIG. 1 shows the well cleaning tool of this invention deployed in a wellbore.

As shown in FIG. 1, a preferred well cleaning tool 200 of the present invention comprises a first vibratory wave generator 205 and a second vibratory wave generator 210. While FIG. 1 shows tool 200 being conveyed down wellbore 105 by wireline 102, any known means of conveying a tool downhole may be used such as a drillstring, coiled tubing, etc. Vibratory wave generators 205 and 210 produce vibratory waves 220 which propagate outward from vibratory wave generators 205 and 210, impacting the interior surface 107 of wellbore 105 and further propagating into geologic formation 250. Preferably, the vibratory waves are acoustically streamed from the vibratory wave generator. As used herein, acoustic streaming means using a low power non-destructive vibratory wave source to produce eddy like currents around obstacles attached to pore walls. In acoustic streaming, waveforms penetrate into the pores and gaps between the contaminating layer and the surface of the formation, and their vibration peels and tears off the contaminating layer. As the contaminating particles begin to oscillate, the contaminating layer is peeled away from the surface of the formation provided that the oscillation forces are greater than the interaction (i.e., adhering) forces between the contaminating layer and surface of the wellbore.

Three types of acoustic streaming are streaming in a viscous boundary layer near obstacles, streaming outside a viscous boundary layer near obstacles, and streaming in a free non-uniform sound field. Obstacles as used herein include contaminant particles adhered to the interior surface of the wellbore. Streaming in a viscous boundary layer near obstacles is small-scale streaming that has stationary flow in the boundary layer. Streaming in a viscous boundary layer near obstacles has rotational character, and the scale of boundary vortices is determined by the thickness of the acoustic boundary layer. Streaming outside the boundary layer also has a vortex character, and the scale of the vortices is equal to the acoustic wavelength. With streaming in a free non-uniform sound field, the in-homogeneity scale of the sound field is much greater than the acoustic wavelength. For all three types, the viscous forces govern the conditions of stabilization of the streaming velocity. For micron- and submicron-size particles near walls, streaming in a viscous boundary layer near obstacles is preferred.

As vibratory waves 220 propagate, their paths overlap such that substantially the same portion of the wellbore and formation are subjected to vibratory waves produced by the individual vibratory wave generators. Overlap in the propagated waves may occur with the tool being held steady in the wellbore, or while the tool is traversed upward or downward in the wellbore. Vibratory waves 220 come into contact with particles, contaminants, scale, earthen debris and the like adhered within formation 250 and on the interior surface 107 of wellbore 105. These contaminants begin to oscillate and loosen their adherence through these streaming mechanisms in response to stimulation by the vibratory waves.

When particles are subjected to vibratory waves generated by a plurality of vibratory wave generators (that is, more than one point source), the particles begin to oscillate in more than one direction. For example, a particle may oscillate both perpendicular and parallel to the surface upon which it is attached. Furthermore, when the vibratory wave generators produce vibratory waves having a plurality of frequencies, the particles are subjected to multiple detachment mechanisms. For example, particles are subjected to a rolling detachment mechanism where the vibratory waves have small velocity amplitudes (i.e., high frequency) and are subjected to an additional lifting mechanism where the vibratory waves have large velocity amplitudes (i.e., low frequency). Therefore, detachment of particles adhered to a surface may be improved by subjecting the particles to vibratory waves generated by a plurality of vibratory wave generators, and further improved if the plurality of wave generators are generating vibratory waves having a plurality of frequencies.

The vibratory wave generators may produce the vibratory waves either simultaneously or sequentially. That is, the vibratory wave generators may be fired either simultaneously or sequentially. Simultaneous firing as used herein means any combination, sequence, or interval of firing wherein two or more wave generators are firing at the same time, for example, total overlap (e.g., one+two+three) as well as partial overlap (e.g., one, then two+three). Sequential firing as used herein means any combination, sequence, or interval of firing wherein only a single wave generator is firing at any given time, for example, a single sequence (e.g., one, two, three, stop), a repeating sequence (e.g., three, two, two, one; three, two, two, one), or a random sequence.

The staging or layout of the cleaning tool and its traversal through a well generally defines the path or sequence in which the well is cleaned. As shown in FIG. 1, as well cleaning tool 200 is lowered into a wellbore, a given section of the wellbore will typically first be subjected to vibratory waves produced by vibratory wave generator 205 positioned at the lower end of the cleaning tool and substantially the same portion of the wellbore is subsequently subjected to vibratory waves produced by vibratory wave generator 210 positioned at the upper end of the cleaning tool. Generally, the cleaning sequence is reversed as the tool is pulled upward in the wellbore. The staging or layout of the vibratory wave generators comprising a cleaning tool may affect the pattern or degree of overlap of the vibratory waves as they propagate from the vibratory wave generators. Furthermore, the sequence and overlap in firing the vibratory wave generators as described herein may alter the cleaning sequence beyond that which is achieved based purely on staging, layout or traversal of the cleaning tool.

The vibratory wave generators may produce vibratory waves having about the same frequency (or range of frequencies) or vibratory waves having a plurality of frequencies (or ranges of frequencies). For the vibratory waves having a plurality of frequencies (or ranges of frequencies), the frequencies may overlap partially or not at all. Stated alternatively, the frequency range of waves produced by a given vibratory wave generator may be the same as, different from, or overlap with the frequency range of waves produced by any other vibratory wave generator. For each vibratory wave generator, the vibratory wave frequencies generated may be held constant for the duration of the cleaning treatment, or they may be varied incrementally, or they may be modulated (i.e., swept) across a range. In a preferred embodiment, the frequency range is repeatedly and simultaneous modulated (i.e., swept) via electrical summing of the oval, hoop, and flexural modes.

The vibratory wave generators may be separate components comprising a downhole tool (as shown by vibratory wave generators 205 and 210 in FIG. 1), or they may be combined into a single housing (not shown). Any number of vibratory wave generators greater than one may be used so long as the resulting cleaning tool remains a manageable size to place down a wellbore. Furthermore, any combination of vibratory wave generator firing sequence, vibratory wave frequencies (or ranges of frequencies), and vibratory wave acoustically streaming types may be used such as simultaneous firing with the same, different, or overlapping constant frequencies (streamed in a viscous boundary layer near obstacles); simultaneous firing with the same, different, or overlapping modulated frequencies (streamed in a viscous boundary layer near obstacles); sequential firing with the same, different, or overlapping constant frequencies (streamed in a viscous boundary layer near obstacles); sequential firing with the same, different, or overlapping modulated frequencies (streamed in a viscous boundary layer near obstacles); and so on.

In a preferred embodiment having two vibratory wave generators, preferably the generators are fired in a repeating sequence, wherein one vibratory wave generator produces vibratory waves having a frequency range greater than the frequency range of the vibratory waves produced by the other vibratory wave generator. In this preferred embodiment, some overlap in frequency ranges is acceptable. More preferably, one vibratory wave generator is a vibrating pipe (as described below) that produces vibratory waves with a frequency range of about 2 to 100 kHz, and the other vibratory wave generator is a piston pulser (as described below) that produces vibratory waves with a frequency range of about 0.2 to 5 kHz. Even more preferably, the vibrating pipe produces vibratory waves with a frequency range of about 2 to 50 kHz, and the piston pulser generator produces vibratory waves with a frequency range of about 0.5 to 2 kHz. Alternative embodiments comprising two vibratory wave generators include a vibrating pipe coupled with a low frequency generator (as described below) and a piston pulser coupled with a low frequency generator.

In a preferred embodiment having three vibratory wave generators, preferably the generators are fired in a repeating sequence, wherein a first vibratory wave generator produces vibratory waves having a frequency range greater than the frequency range of the vibratory waves produced by the second and third vibratory wave generators and a second vibratory wave generator produces vibratory waves having a frequency range greater than the frequency range of the vibratory waves produced by the third vibratory wave generator. In this preferred embodiment, some overlap in frequency ranges is acceptable. More preferably, the first vibratory wave generator is a vibrating pipe (as described below) that produces vibratory waves with a frequency range of about 2 to 100 kHz, the second vibratory wave generator is a piston pulser (as described below) that produces vibratory waves with a frequency range of about 0.2 to 5 kHz, and the third vibratory wave generator is a low frequency generator (as described below) that produces vibratory waves with a frequency range of about 0.05 to 0.2 kHz. Even more preferably, the vibrating pipe produces vibratory waves with a frequency range of about 2 to 50 kHz, the piston pulser generator produces vibratory waves with a frequency range of about 0.5 to 2 kHz, and the low frequency generator produces vibratory waves with a frequency range of about 0.05 to 0.2 kHz.

While any known vibratory wave generators suitable for use in a wellbore and capable of acoustically streaming vibratory waves of the desired frequency may be used in carrying out the invention, preferred vibratory wave generators include a piston pulser, a vibrating pipe, and a low frequency vibratory wave generator comprising a valve with a controller.

Figures 5, 6:
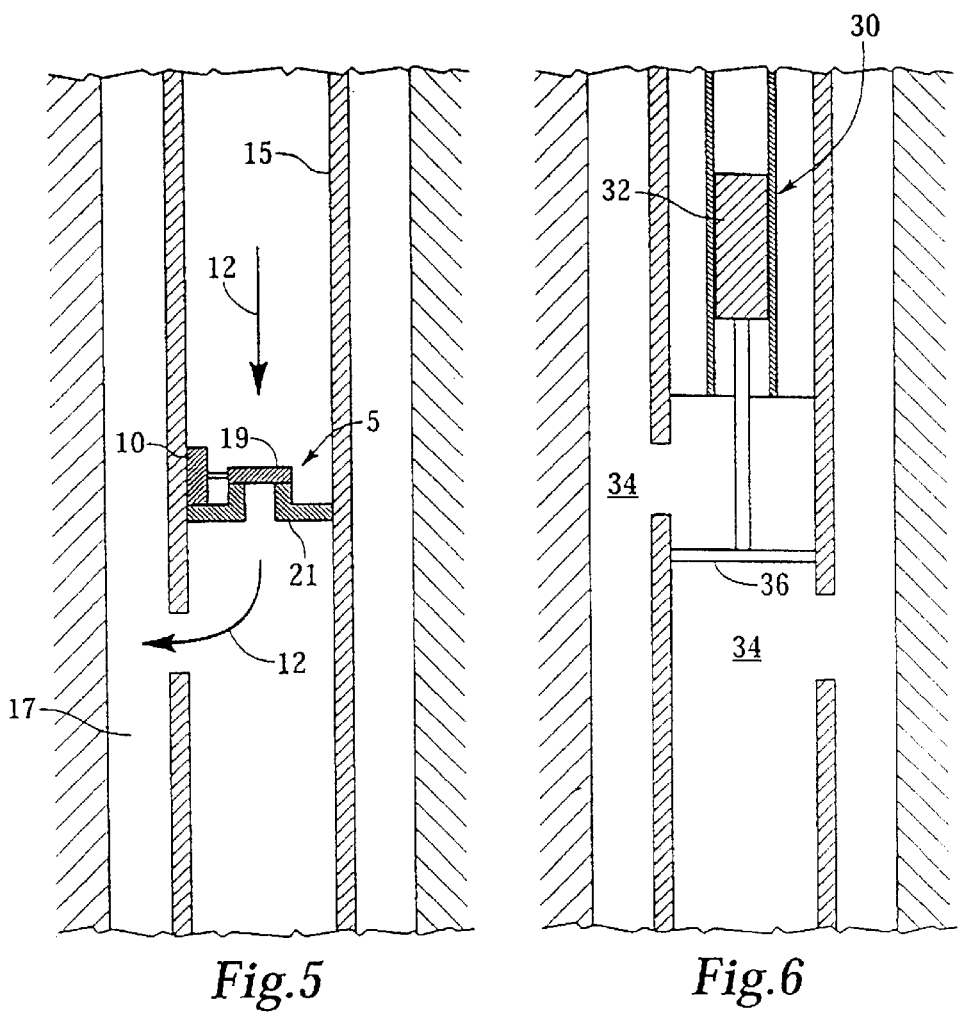
FIG. 5 is a longitudinal cross-section of a low frequency vibratory wave generator comprising a valve.
FIG. 6 is a longitudinal cross-section of a vibratory wave generator referred to as a piston pulser.

Referring to FIG. 6, a piston pulser 30 uses the movement of a large control piston 32 to displace fluid 34 at a prescribed and controllable frequency. A preferred piston pulser is disclosed in U.S. Pat. No. 6,102,152 entitled Dipole/Monopole Acoustic Transmitter, Methods for Making and Using Same in Down Hole Tools, incorporated by reference herein in its entirety. The operation of a control piston is controlled by a hydraulic system comprising an accumulator, a control fluid, a connecting hydraulic conduit, an electrically operated switching valve to direct the control fluid, and switching valve control electronics. When energized, the accumulator provides a high pressure source of hydraulic fluid that is alternatively directed to either side of the control piston. This causes the control piston to oscillate at a controllable frequency. The control piston 32 may be in direct contract with the well fluid, or may be connected to a slave piston 36 which is in intimate contact with the well fluid. Pulsing the control piston by means of an electrical power supply causes a sympathetic pulsation in the well fluid, thereby creating the vibratory cleaning waves as described previously.

Figure 2:
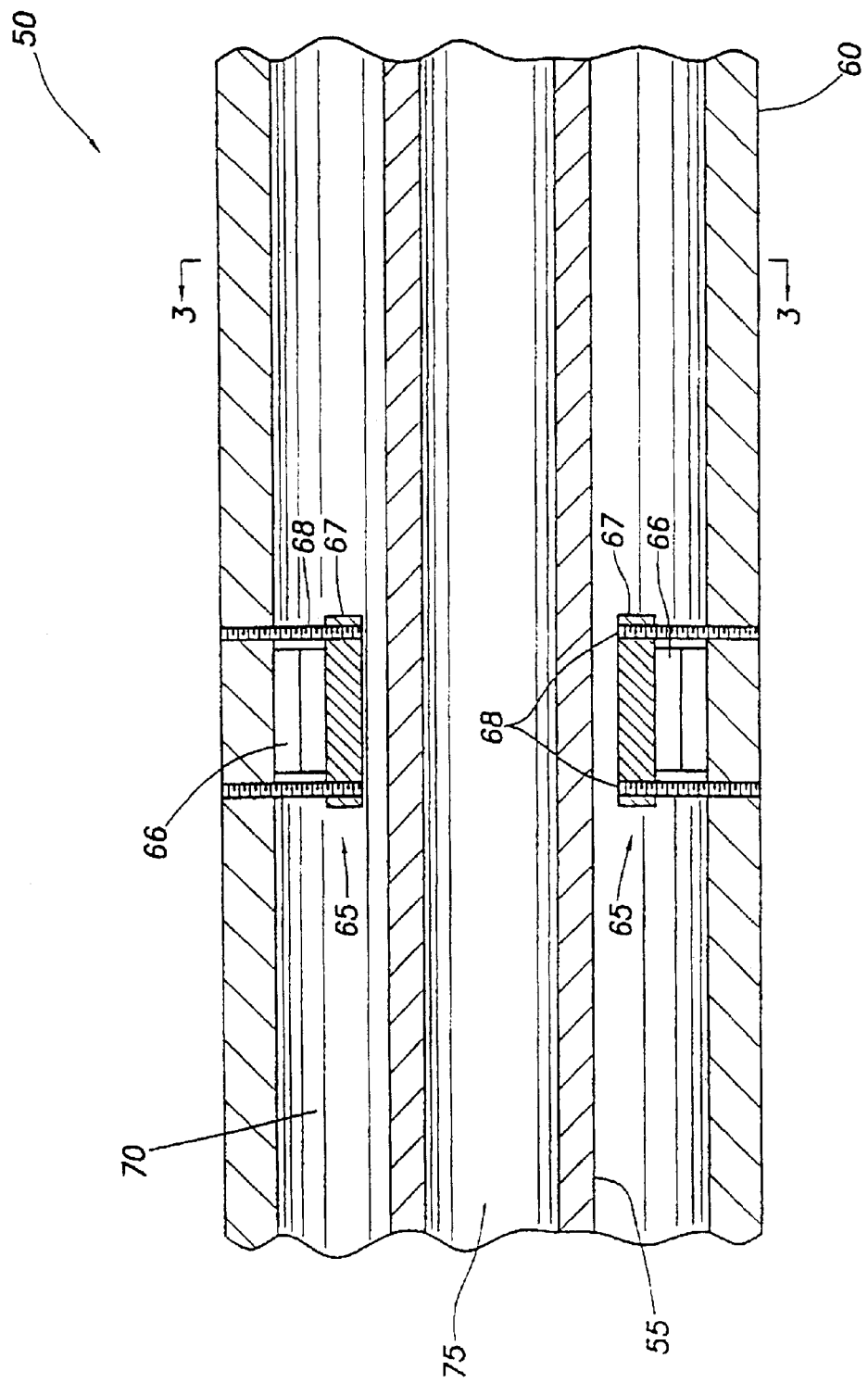
FIG. 2 is a longitudinal cross section of a preferred vibratory wave generator referred to as a vibrating pipe.
Figure 3:
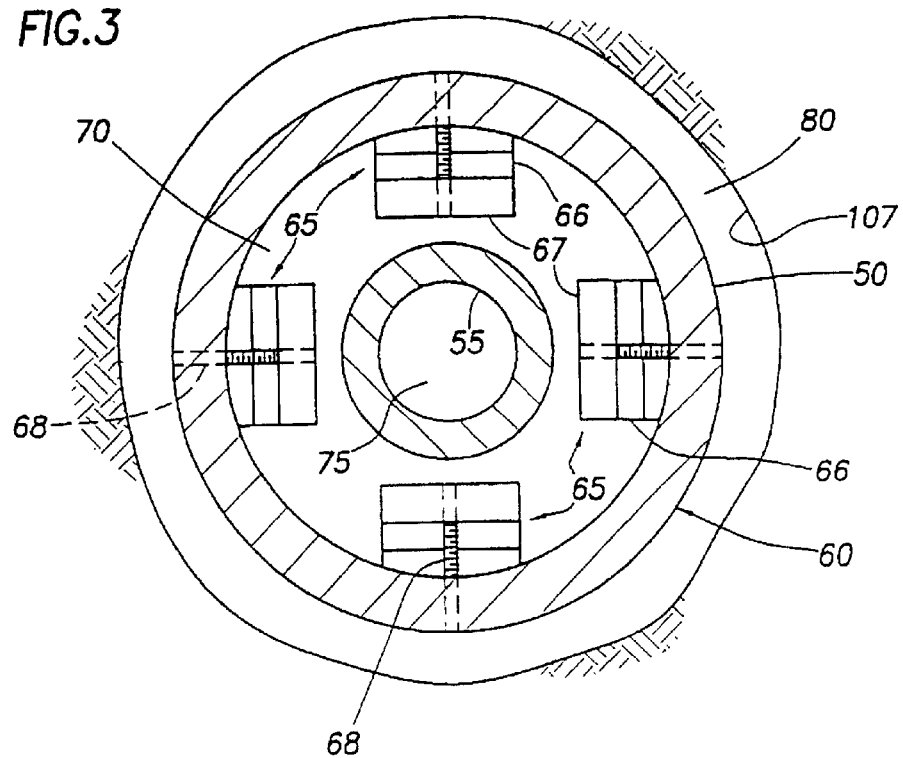
FIG. 3 is a cross section taken along line A—A of the preferred vibrating pipe vibratory wave generator of FIG. 2.

FIGS. 2 and 3 show a preferred vibrating pipe vibratory wave generator. Vibrating pipe 50 has an inner pipe 55 and an outer pipe 60 with drivers 65 in hermetically sealed chamber 70 between the pipes. Fluids flow through inner bore 75 and return through the annulus 80 formed between vibrating pipe 50 and interior surface 107 of the wellbore. Preferably, drivers 65 contact only the interior wall of outer pipe 60 and obtain large deflections in the wall of outer pipe 60 due to resonance modes of the wall of outer pipe 60. In a preferred embodiment, drivers 65 are transducers comprising floating piezoelectric stacks 66 with backing masses 67. Tensioning bolts 68 secure backing masses 67 and piezoelectric stacks 66 to the interior wall of outer pipe 60. During resonance, the deflection of the wall of outer pipe 60 can be many times larger than the axial deflection of the piezoelectric stack. These large wall deflections efficiently convert electrical energy into vibratory wave energy in annulus 80.

Dissipation losses of acoustic energy limit the amplitude of the vibratory waves for a given amount of available energy. Thus, attenuation of the vibratory waves in the annulus liquid will reduce vibratory wave intensity. Furthermore, for a given density, completion fluids have smaller attenuation than drilling mud. Therefore, to optimize cleaning, suspended solids are preferably flushed from the annulus before acoustic cleaning, and a completion fluid is preferably used in place of a drilling mud.

As described in co-pending U.S. patent application Ser. No. 09/464,728, filed Dec. 16, 1999 and entitled Vibrational Forced Mode Fluid Property Monitor and Method, incorporated by reference herein in its entirety, the polarization and frequency of drivers 65 determine the particular mode of resonance in the wall of outer pipe 60. Flexural, hoop and oval modes and the transducer switching sequence are described in U.S. patent application Ser. No. 09/464,728. For use with the present application, it is sufficient to sweep the driver frequency range without determining the resonant frequency. In a preferred cleaning embodiment, the driver frequency range is repeatedly and simultaneously swept via electrical summing of the oval, hoop, and the flexural modes. Multiple rings of transducers give greater signal strength for cleaning. Ultimately, the acoustic power of the vibrational pipe is limited by the electric power available for the drivers.

Referring to FIG. 5, a low frequency vibratory wave generator comprises a valve 5 and controller 10 that disrupts the flow of fluid (as shown by arrows 12) from within the workstring/drilling 15 to the external wellbore 17. Disrupting the fluid stream will cause sharp increases and decreases in the pressure field associated with the fluid flow. These low frequency pulses create the desired wave energy that can be used to clean the wellbore.

Preferred values include rotary valves and the shear-type valve disclosed in U.S. Pat. No. 4,790,393 entitled Valve for Drilling Fluid Telemetry Systems. Such valves can be used to produce a brief pressure pulse in the annulus around the drillstring. The pressure pulse gives rise to strong, low frequency tube waves and compressional waves in the borehole, which can be used to direct acoustic energy into a formation for acoustic stimulation.

In some embodiments, it may be desirable for the pressure in the annulus to be greater than the pressure in the bore of the drillstring. In this case, some modifications are needed for successful operation of the valve described in U.S. Pat. No. 4,790,393. In particular, the valve should be re-designed so that the orientation of the gate/seat pair is reversed from what is disclosed in U.S. Pat. No. 4,790,393. Referring to FIG. 5, that is, the gate 19 must always be on the high pressure side of the valve 5, and the seat 21 must always be on the low pressure side of the valve 5. It may be desirable to add a screen to the outside of the valve to prevent particulate matter from jamming the valve. Typically, the valve is controlled using a solenoid, which in turn is controlled through electronic circuitry, which may be either battery or turbine powered.

Figure 4:
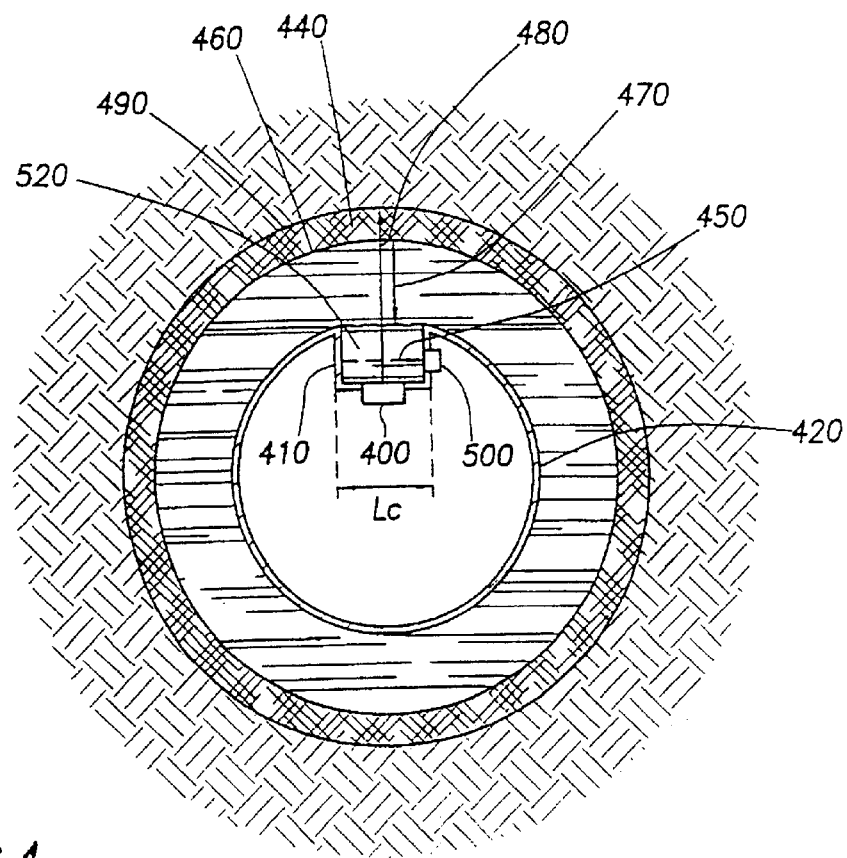
FIG. 4 is a cross section of a well cleaning tool of this invention deployed in a wellbore, the tool being a preferred embodiment for monitoring the cleaning performance by measuring the thickness of the mudcake layer.

In a preferred embodiment, acoustic transducers operating in the frequency range of 100 KHz to 10 MHz can be used to monitor the performance of the cleaning tool by measuring the thickness of the mudcake layer and monitoring the variation of the mudcake thickness as a result of the vibratory cleaning treatment. As shown in FIG. 4, transducers 400 and 500 are built into a cut-in cavity 410 on a separate pipe or on the cleaning tool 420 itself. Transducer 500 is positioned on one side of the cavity. Transducer 500 provides calibration of the speed of sound through the wellbore fluid 520 that is close to the transducer 400, by transmitting tone-burst signals 450 and measuring time of flight of the reflection echo from the opposite side of the cavity. The cavity calibration path length $L_c$ is known. To measure mudcake thickness, transducer 400 transmits ultrasonic signals, preferably tone-burst sine wave signals of a finite number of cycles, into the wellbore fluid 520 and mudcake 440. The transmitting frequency is preferred to vary in the range of 100 KHz to 10 MHz. Time of flight (i.e., the "slowness" time) $T_1$ of a first reflection echo 470 that is from the wellbore fluid-mudcake boundary 460 is measured. For the same waveform, time of flight $T_2$ of a second reflection echo 480 that is from the mudcake-formation boundary 490 is measured. Mudcake-formation boundary 490 is also referred to as the boundary of the mudcake and the interior surface of the wellbore. Mudcake thickness is determined by $L=(T_2-T_1)*c/2$, where c is speed of sound in the mudcake as calibrated by transducer 500.

In order to detect the second echo that is the reflection from mudcake-formation boundary 490, focused transducer, variable transmitting frequency, or short duration cycle tone-burst signals are preferably used. Due to the usually higher acoustic impedance mismatch at the mudcake-formation boundary 490 than that at the wellbore fluid-mudcake boundary 460, use of a transducer with a focusing beam on the wellbore surface region has better transmission and reflection efficiency than those from a planar transducer. Use of variable discrete frequencies over a wide range can improve the sensitivity of reflection echo measurement over a wide range of the mudcake thickness. Higher frequency signals having a shorter wavelength (i.e., short duration cycle tone-burst signals) can be used for thin mudcake layer measurement. As a preferred embodiment, in order to detect second reflection echo 480, the number of cycles for the tone-bust signal n should be preferably less than $2L/\lambda$, where $\lambda=c/f$ is the wavelength of the vibratory wave in the mudcake, c is the calibrated speed of sound in the wellbore fluid, f is the frequency of the signal, and L is the mudcake thickness.

By measuring the variation of the time of fight of the reflection echo from the wellbore fluid-mudcake boundary 460, the variation in thickness of the mudcake at different points in time as result of cleaning treatment can be monitored as well. For example, by measuring of the time of flight performed before (i.e., at a first point in time) and after (i.e., at a second point in time) the cleaning treatment, the decrease in the mudcake layer ($\Delta L$) equals $0.5*(T_{1a}*c_a-T_{1b}*c_b)$, where $c_a$ and $c_b$ are the calibrated speeds of sound in the wellbore fluid after and before the treatment, respectively, and $T_{1a}$ and $T_{1b}$ are the time of flight of the reflection echo from the wellbore fluid-mudcake boundary after and before the treatment, respectively. High resolution of the mudcake thickness variation can be achieved. For example, with speed of sound (c) equal to 1600 m/s and a typical timing measurement resolution of 0.01 microsecond, the resolution of the measurable mudcake thickness variation is about 8 micrometers. Multiple pairs of cavity-transducers may be used on different angles on the circumference of the tool to monitor different portions of the wellbore surface being cleaned by the vibratory wave generator cleaning tool.

The well cleaner of the present invention is particularly useful for removing mudcake form the interior surface of the wellbore. Particles detached by the well cleaner tool may be removed along with hydrocarbon production, removed with a circulating fluid (preferably a non-caking, single-phase circulation fluid) during cleaning, or allowed to settle in the bottom of the wellbore. In a preferred embodiment the wellbore has a lower pressure than the formation, thereby allowing some fluid to flow from the formation into the wellbore and enhancing removal of the mudcake. The optimum pressure drop or flow rate across the area to be cleaned may be determined theoretically, experimentally or empirically.

What is claimed is:

1. A process for treating a wellbore, comprising:
    subjecting a substantially same portion of the wellbore to vibratory waves produced by a plurality of vibratory wave generators;
    wherein the vibratory waves have about the same frequency;
    wherein the frequencies are modulated; and
    wherein the frequencies are repeatedly and simultaneous modulated via electrical summing of oval, hoop, and flexural modes.

2. A process for treating a wellbore, comprising:
    subjecting a substantially same portion of the wellbore to vibratory waves produced by a plurality of vibratory wave generators;
    wherein the vibratory waves have a plurality of frequencies;
    wherein the frequencies are modulated; and
    wherein the frequencies are repeatedly and simultaneous modulated via electrical summing of an oval, hoop, and flexural modes.

3. A process for treating a wellbore to remove contaminant particles therefrom, comprising:
    subjecting a substantially same portion of the wellbore to vibratory waves produced by a plurality of vibratory wave generators to loosen contaminant particles from the surface of the well bore; and
    removing particles detached by the vibratory waves from the wellbore,
    wherein at least one vibratory wave generator is a vibrating pipe and
    wherein the vibrating pipe comprises an inner pipe positioned within an outer pipe and forming a hermetically sealed chamber between the exterior surface of the inner pipe and the interior surface of the outer pipe, and a plurality of drivers attached to the interior surface of the outer pipe.

4. The process of claim 3 wherein at least one of the drivers is a transducer.

5. The process of claim 4 wherein the transducer comprises floating piezoelectric stacks.

6. A process for treating a wellbore to remove contaminant particles therefrom, comprising:
    subjecting a substantially same portion of the wellbore to vibratory waves produced by a plurality of vibratory wave generators to loosen contaminant particles from the surface of the wellbore; and
    removing particles detached by the vibratory waves from the wellbore,
    wherein at least one vibratory wave generator is a piston pulser and
    wherein the piston pulser comprises a hydraulically actuated control piston connected to a slave piston, the slave piston being in contact with a fluid in the wellbore.

7. A process for treating a wellbore to remove contaminant particles therefrom, comprising:
    subjecting a substantially same portion of the wellbore to vibratory waves produced by a plurality of vibratory wave generators to loosen contaminant particles from the surface of the wellbore; and removing particles detached by the vibratory waves from the wellbore, wherein at least one vibratory wave generator is a valve.

8. The process of claim 7 wherein the valve is a rotary valve.

9. The process of claim 7 wherein the valve is a shear-type valve.

10. The process of claim 9 wherein the valve has a gate and a seat, and the gate is on the high pressure side of the valve and the seat is on the low pressure side of the valve.

11. A process for treating a wellbore, comprising:

subjecting a portion of the wellbore to vibratory waves having a first frequency produced by a first vibratory wave generator;

subjecting substantially the same portion of the wellbore to vibratory waves having a second frequency produced by a second vibratory wave generator;

wherein the first frequency about equals the second frequency; and wherein the frequencies are repeatedly and simultaneous modulated via electrical summing of oval, hoop, and flexural modes.

12. A process for treating a wellbore, comprising:

subjecting a portion of the wellbore to vibratory waves having a first frequency produced by a first vibratory wave generator;

subjecting substantially the same portion of the wellbore to vibratory waves having a second frequency produced by a second vibratory wave generator;

wherein the first frequency about does not equal the second frequency; and wherein the frequencies are repeatedly and simultaneous modulated via electrical summing of oval, hoop, and flexural modes.

13. A process for treating a wellbore, comprising:

subjecting a portion of the wellbore to vibratory waves having a first frequency produced by a first vibratory wave generator;

subjecting substantially the same portion of the wellbore to vibratory waves having a second frequency produced by a second vibratory wave generator;

wherein the first frequency partially overlaps the second frequency; and wherein the frequencies are repeatedly and simultaneous modulated via electrical summing of oval, hoop, and flexural modes.

14. A process for treating a wellbore, comprising:

subjecting a portion of the wellbore to vibratory waves having a first frequency produced by a first vibratory wave generator;

subjecting substantially the same portion of the wellbore to vibratory waves having a second frequency produced by a second vibratory wave generator;

wherein the first frequency is in the range of about 2 to 100 kHz and the second frequency is in the range of about 0.2 to 5 kHz; and wherein the frequencies are repeatedly and simultaneous modulated via electrical summing of oval, hoop, and flexural modes.

15. A process for treating a wellbore, comprising:

subjecting a portion of the wellbore to vibratory waves having a first frequency produced by a first vibratory wave generator;

subjecting substantially the same portion of the wellbore to vibratory waves having a second frequency produced by a second vibratory wave generator:

wherein the first frequency is in the range of about 2 to 50 kHz and the second frequency is in the range of about 0.5 to 2 kHz;

wherein the frequencies are repeatedly and simultaneous modulated via electrical summing of oval, hoop, and flexural modes.

16. A process for treating a wellbore to remove contaminant particles therefrom, comprising:

subjecting a portion of the wellbore to vibratory waves having a first frequency produced by a first vibratory wave generator to loosen contaminant particles from the surface of the wellbore;

subjecting substantially the same portion of the wellbore to vibratory waves having a second frequency produced by a second vibratory wave generator to further loosen contaminant particles; and removing particles detached by the vibratory waves from the wellbore, wherein the first vibratory wave generator is a vibrating pipe and wherein the vibrating pipe comprises an inner pipe positioned within an outer pipe and forming a hermetically sealed chamber between the exterior surface of the inner pipe and the interior surface of the outer pipe, and a plurality of drivers attached to the interior surface of the outer pipe.

17. The process of claim 16 wherein at least one of the drivers is a transducer.

18. The process of claim 17 wherein the transducer comprises floating piezoelectric stacks.

19. The process of claim 16 wherein the second vibratory wave generator is a piston pulser.

20. The process of claim 19 wherein the piston pulser comprises a hydraulically actuated control piston connected to a slave piston, the slave piston being in contact with a fluid in the wellbore.

21. A process for treating a wellbore to remove contaminant particles therefrom, comprising:

subjecting a portion of the wellbore to vibratory waves having a first frequency produced by a first vibratory wave generator to loosen contaminant particles from the surface of the wellbore;

subjecting substantially the same portion of the wellbore to vibratory waves having a second frequency produced by a second vibratory wave generator to further loosen contaminant particles; and removing particles detached by the vibratory waves from the wellbore, wherein the first vibratory wave generator is a vibrating pipe and wherein the second vibratory wave generator is a valve.

22. The process of claim 21 wherein the valve is a rotary valve.

23. The process of claim 21 wherein the valve is a shear-type valve.

24. The process of claim 23 wherein the valve has a gale and a seat, and the gate is on the high pressure side of the valve and the seat is on the low pressure side of the valve.

25. A process for treating a wellbore to remove contaminant particles therefrom, comprising:

subjecting a portion of the wellbore to vibratory waves having a first frequency produced by a first vibratory wave generator to loosen contaminant particles from the surface of the wellbore;

subjecting substantially the same portion of the wellbore to vibratory waves having a second frequency produced by a second vibratory wave generator to further loosen contaminant particles; and removing particles detached by the vibratory waves from the wellbore, wherein the first vibratory wave generator is a piston pulser and the second vibratory wave generator is a valve.

26. A process for treating a wellbore, comprising:

subjecting a portion of the wellbore to vibratory waves having a first frequency produced by a first vibratory wave generator;

subjecting substantially the same portion of the wellbore to vibratory waves having a second frequency produced by a second vibratory wave generator;

further comprising subjecting substantially the same portion of the wellbore to vibratory waves having a third frequency produced by a third vibratory wave generator;

wherein the first, second, and third frequencies are about equal;

wherein the frequencies are modulated; and wherein the frequencies are repeatedly and simultaneous modulated via electrical summing of oval, hoop, and flexural modes.

27. A process for treating a wellbore, comprising:

subjecting a portion of the wellbore to vibratory waves having a first frequency produced by a first vibratory wave generator;

subjecting substantially the same portion of the wellbore to vibratory waves having a second frequency produced by a second vibratory wave generator;

further comprising subjecting substantially the same portion of the wellbore to vibratory waves having a third frequency produced by a third vibratory wave generator;

wherein the first frequency about does not equal the second frequency and the second frequency about does not equal the third frequency;

wherein the frequencies are modulated; and wherein the frequencies are repeatedly and simultaneous modulated via electrical summing of oval, hoop, and flexural modes.

28. A process for treating a wellbore, comprising:

subjecting a portion of the wellbore to vibratory waves having a first frequency produced by a first vibratory wave generator;

subjecting substantially the same portion of the wellbore to vibratory waves having a second frequency produced by a second vibratory wave generator;

further comprising subjecting substantially the same portion of the wellbore to vibratory waves having a third frequency produced by a third vibratory wave generator;

wherein the first frequency is greater than the second frequency and the second frequency is greater than the third frequency;

wherein the frequencies are modulated; and wherein the frequencies are repeatedly and simultaneous modulated via electrical summing of oval, hoop, and flexural modes.

29. A process for treating a wellbore, comprising:

subjecting a portion of the wellbore to vibratory waves having a first frequency produced by a first vibratory wave generator;

subjecting substantially the same portion of the wellbore to vibratory waves having a second frequency produced by a second vibratory wave generator;

further comprising subjecting substantially the same portion of the wellbore to vibratory waves having a third frequency produced by a third vibratory wave generator;

wherein the first frequency partially overlaps the second frequency and the second frequency partially overlaps the third frequency;

wherein the frequencies are modulated; and wherein the frequencies are repeatedly and simultaneous modulated via electrical summing of oval, hoop, and flexural modes.

30. A process for treating a wellbore, comprising:

subjecting a portion of the wellbore to vibratory waves having a first frequency produced by a first vibratory wave generator;

subjecting substantially the same portion of the wellbore to vibratory waves having a second frequency produced by a second vibratory wave generator;

further comprising subjecting substantially the same portion of the wellbore to vibratory waves having a third frequency produced by a third vibratory wave generator;

wherein the first frequency is in the range of about 2 to 100 kHz, the second frequency is in the range of about 0.2 to 5 kHz, and the third frequency is in the range of about 0.05 to 0.2 kHz;

wherein the frequencies are modulated; and wherein the frequencies are repeatedly and simultaneous modulated via electrical summing of oval, hoop, and flexural modes.

31. A process for treating a wellbore, comprising:

subjecting a portion of the wellbore to vibratory waves having a first frequency produced by a first vibratory wave generator;

subjecting substantially the same portion of the wellbore to vibratory waves having a second frequency produced by a second vibratory wave generator;

further comprising subjecting substantially the same portion of the wellbore to vibratory waves having a third frequency produced by a third vibratory wave generator;

wherein the first frequency is in the range of about 2 to 50 kHz, the second frequency is in the range of about 0.5 to 2 kHz, and the third frequency is in the range of about 0.05 to 0.2 kHz;

wherein the frequencies are modulated; and wherein the frequencies are repeatedly and simultaneous modulated via electrical summing of oval, hoop, and flexural modes.

32. A process for treating a wellbore to remove contaminant particles therefrom, comprising:

subjecting a portion of the wellbore to vibratory waves having a first frequency produced by a first vibratory wave generator to loosen contaminant particles from the surface of the wellbore;

subjecting substantially the same portion of the wellbore to vibratory waves having a second frequency produced by a second vibratory wave generator to further loosen contaminant particles; and removing particles detached by the vibratory waves from the wellbore, wherein the first vibratory wave generator is a vibrating pipe;

wherein the vibrating pipe comprises an inner pipe positioned within an outer pipe and forming a hermetically sealed chamber between the exterior surface of the inner pipe and the interior surface of the outer pipe, and a plurality of drivers attached to the interior surface of the outer pipe; and wherein the second vibratory wave generator is a piston pulser, and further comprising subjecting substantially the same portion of the wellbore to vibratory waves having a third frequency produced by a third vibratory wave generator comprising a valve.

33. The process of claim 32 wherein the valve is a rotary valve.

34. The process of claim 32 wherein the valve is a shear-type valve.

35. The process of claim 34 wherein the valve has a gate and a seat, and the gate is on the high pressure side of the valve and the seat is on the low pressure side of the valve.

36. A process for measuring the thickness of a mudcake on the interior surface of a wellbore, comprising:
 (a) calibrating the speed of sound in a fluid in the wellbore;
 (b) transmitting an ultrasonic signal from a transducer;
 (c) measuring the time of flight for an echo of the ultrasonic signal reflected from the boundary of the wellbore fluid and the mudcake back to the transducer;
 (d) measuring the time of flight for an echo of the ultrasonic signal reflected from the boundary of the mudcake and the interior surface of the wellbore back to the transducer; and
 (e) calculating the thickness of the mudcake according to the equation $L=(T_2-T_1)*c/2$, where L is the thickness of the mudcake, c is the speed of sound calibrated in step (a), $T_1$ is the time of flight for an echo reflected from the boundary of the wellbore fluid and the mudcake measured in step (c), and $T_2$ is time of flight for an echo reflected from the boundary of the mudcake and the interior surface of the wellbore measured in step (d).

37. The process of claim 36 wherein the step of calibrating the speed of sound further comprises transmitting a lone burst signal from a second transducer and measuring the time of flight of a reflection echo across a known distance.

38. A process for treating a wellbore, comprising:
 subjecting a substantially same portion of the wellbore to vibratory waves produced by a plurality of vibratory wave generators; and
 further comprising the step of measuring the thickness of a mudcake on the interior surface of a wellbore, comprising:
  (a) calibrating the speed of sound in a fluid in the wellbore;
  (b) transmitting an ultrasonic signal from a transducer;
  (c) measuring the time of flight for an echo of the ultrasonic signal reflected from the boundary of the wellbore fluid and the mudcake back to the transducer;
  (d) measuring the time of flight for an echo of the ultrasonic signal reflected from the boundary of the mudcake and the interior surface of the wellbore back to the transducer; and
  (e) calculating the thickness of the mudcake according to the equation $L=(T_2-T_1)*c/2$, where L is the thickness of the mudcake, c is the speed of sound calibrated in step (a), $T_1$ is the time of flight for an echo reflected from the boundary of the wellbore fluid and the mudcake measured in step (c), and $T_2$ is time of flight for an echo reflected from the boundary of the mudcake and the interior surface of the wellbore measured in step (d).

39. A process for treating a wellbore, comprising:
 subjecting a portion of the wellbore to vibratory waves having a first frequency produced by a first vibratory wave generator; and
 subjecting substantially the same portion of the wellbore to vibratory waves having a second frequency produced by a second vibratory wave generator; and
 further comprising the step of measuring the thickness of a mudcake on the interior surface of a wellbore, comprising:
  (a) calibrating the speed of sound in a fluid in the wellbore;
  (b) transmitting an ultrasonic signal from a transducer
  (c) measuring the time of flight for an echo of the ultrasonic signal reflected from the boundary of the wellbore fluid and the mudcake back to the transducer;
  (d) measuring the time of flight fir an echo of the ultrasonic signal reflected from the boundary of the mudcake and the interior surface of the wellbore back to the transducer; and
  (e) calculating the thickness of the mudcake according to the equation $L=(T_2-T_1)*c/2$, where L is the thickness of the mudcake, c is the speed of sound calibrated in step (a), $T_1$ is the time of flight for an echo reflected from the boundary of the wellbore fluid and the mudcake measured in step (c), and $T_2$ is time of flight for an echo reflected from the boundary of the mudcake and the interior surface of the wellbore measured in step (d).

40. A process for treating a wellbore, comprising:
 subjecting a portion of the wellbore to vibratory waves having a first frequency produced by a first vibratory wave generator;
 subjecting substantially the same portion of the wellbore to vibratory waves having a second frequency produced by a second vibratory wave generator;
 further comprising subjecting substantially the same portion of the wellbore to vibratory waves having a third frequency produced by a third vibratory wave generator; and
 further comprising the step of measuring the thickness of a mudcake on the interior surface of a wellbore, comprising:
  (a) calibrating the speed of sound in a fluid in the wellbore;
  (b) transmitting an ultrasonic signal from a transducer;
  (c) measuring the time of flight for an echo of the ultrasonic signal reflected from the boundary of the wellbore fluid and the mudcake back to the transducer;
  (d) measuring the time of flight for an echo of the ultrasonic signal reflected from the boundary of the mudcake and the interior surface of the wellbore back to the transducer; and (e) calculating the thickness of the mudcake according to the equation $L=(T_2-T_1)*c/2$, where L is the thickness of the mudcake, c is the speed of sound calibrated in step (a), $T_1$ is the time of flight for an echo reflected from the boundary of the wellbore fluid and the mudcake measured in step (c), and $T_2$ is time of flight for an echo reflected from the boundary of the mudcake and the interior surface of the wellbore measured in step (d).

41. A process for treating a wellbore, comprising:

subjecting a substantially same portion of the wellbore to vibratory waves produced by a plurality of vibratory wave generators;

wherein at least one vibratory wave generator is a vibrating pipe;

wherein the vibrating pipe comprises an inner pipe positioned within an outer pipe and forming a hermetically sealed chamber between the exterior surface of the inner pipe and the interior surface of the outer pipe, and a plurality of drivers attached to the interior surface of the outer pipe;

wherein at least one of the drivers is a transducer; and further comprising the step of measuring the thickness of a mudcake on the interior surface of a wellbore, comprising:
- (a) calibrating the speed of sound in a fluid in the wellbore;
- (b) transmitting an ultrasonic signal from the transducer;
- (c) measuring the time of flight for an echo of the ultrasonic signal reflected from the boundary of the wellbore fluid and the mudcake back to the transducer;
- (d) measuring the lime of flight for an echo of the ultrasonic signal reflected from the boundary of the mudcake and the interior surface of the wellbore back to the transducer; and
- (e) calculating the thickness of the mudcake according to the equation $L=(T_2-T_1)*c/2$, where L is the thickness of the mudcake, c is the speed of sound calibrated in step (a), $T_1$ is the time of flight for an echo reflected from the boundary of the wellbore fluid and the mudcake measured in step (c), and $T_2$ is time of flight for an echo reflected from the boundary of the mudcake and the interior surface of the wellbore measured in step (d).

42. The process of claim 41 wherein the step of calibrating the speed of sound further comprises transmitting a tone burst signal from a second transducer on the vibrating pipe and measuring the time of flight of a reflection echo across a known distance.

43. A process for treating a wellbore, comprising:

subjecting a portion of the wellbore to vibratory waves having a first frequency produced by a first vibratory wave generator;

subjecting substantially the same portion of the wellbore to vibratory waves having a second frequency produced by a second vibratory wave generator;

wherein the first vibratory wave generator is a vibrating pipe;

wherein the vibrating pipe comprises an inner pipe positioned within an outer pipe and forming a hermetically sealed chamber between the exterior surface of the inner pipe and the interior surface of the outer pipe, and a plurality of drivers attached to the interior surface of the outer pipe;

wherein at least one of the drivers is a transducer; and further comprising the step of measuring the thickness of a mudcake on the interior surface of a wellbore, comprising:
- (a) calibrating the speed of sound in a fluid in the wellbore;
- (b) transmitting an ultrasonic signal from the transducer;
- (c) measuring the time of flight for an echo of the ultrasonic signal reflected from the boundary of the wellbore fluid and the mudcake back to the transducer;
- (d) measuring the time of flight for an echo of the ultrasonic signal reflected from the boundary of the mudcake and the interior surface of the wellbore back to the transducer; and
- (e) calculating the thickness of the mudcake according to the equation $L=(T_2-T_1)*c/2$, where L is the thickness of the mudcake, c is the speed of sound calibrated in step (a), $T_1$ is the time of flight for an echo reflected from the boundary of the wellbore fluid and the mudcake measured in step (c), and $T_2$ is time of flight for an echo reflected from the boundary of the mudcake and the interior surface of the wellbore measured in step (d).

44. The process of claim 43 wherein the step of calibrating the speed of sound further comprises transmitting a tone burst signal from a second transducer on the vibrating pipe and measuring the time of flight of a reflection echo across a known distance.

45. A process for measuring the change in thickness of a mudcake on the interior surface of a wellbore, comprising;
- (a) at a first point in time, calibrating the speed of sound in a fluid in the wellbore;
- (b) at the first point in lime, transmitting an ultrasonic signal from a transducer and measuring the time of flight for an echo reflected horn the boundary of the wellbore fluid and the mudcake hack to the transducer;
- (c) at a second point in time after the first point in time, calibrating the speed of sound in the fluid in the wellbore;
- (d) at the second point in time, transmitting an ultrasonic signal from the transducer and measuring the time of flight for an echo reflected from the boundary of the wellbore fluid and the mudcake back to the transducer; and
- (e) calculating the change in thickness of the mudcake between the second point in time and the first point in time according to the equation $\Delta L=0.5*(T_{1a}*c_a - T_{1b}*c_b)$ where $\Delta L$ is the change in thickness of the mudcake, $c_a$ is the speed of sound calibrated in step (c), $c_b$ is the speed of sound calibrated in step (a), $T_{1a}$ is the time of flight for an echo reflected from the boundary of the wellbore fluid and the mudcake measured in step (d), and $T_{1b}$ is the time of flight for an echo reflected from the boundary of the wellbore fluid and the mudcake measured in step (b).

46. A process for treating a wellbore, comprising:

subjecting a substantially same portion of the wellbore to vibratory waves produced by a plurality of vibratory wave generators; and further comprising measuring the change in thickness of a mudcake on the interior surface of a wellbore, comprising:
- (a) at a first point in time, calibrating the speed of sound in a fluid in the wellbore;

(b) at the first point in time, transmitting an ultrasonic signal from a transducer and measuring the time of flight for an echo reflected from the boundary of the wellbore fluid and the mudcake back to the transducer;

(c) at a second point in time after the first point in time, calibrating the speed of sound in the fluid in the wellbore;

(d) at the second point in time, transmitting an ultrasonic signal from the transducer and measuring the time of flight for an echo reflected from the boundary of the wellbore fluid and the mudcake back to the transducer; and (e) calculating the change in thickness of the mudcake between the second point in time and the first point in time according to the equation $\Delta L=0.5*(T_{1a}*c_a-T_{1b}*c_b)$, where $\Delta L$ is the change in thickness of the mudcake, $c_a$ is the speed of sound calibrated in step (c), $c_b$ is the speed of sound calibrated in step (a), $T_{1a}$ is the time of flight for an echo reflected from the boundary of the wellbore fluid and the mudcake measured in step (d), and $T_{1b}$ is the time of flight for an echo reflected from the boundary of the wellbore fluid and the mudcake measured in step (b).

47. A process for treating a wellbore, comprising:

subjecting a portion of the wellbore to vibratory waves having a first frequency produced by a first vibratory wave generator;

subjecting substantially the same portion of the wellbore to vibratory waves having a second frequency produced by a second vibratory wave generator; and further comprising measuring the change in thickness of a mudcake on the interior surface of a wellbore, comprising:

(a) at a first point in time, calibrating the speed of sound in a fluid in the wellbore;

(b) at the first point in time, transmitting an ultrasonic signal from a transducer and measuring the time of flight for an echo reflected from the boundary of the wellbore fluid and the mudcake back to the transducer;

(c) at a second point in time after the first point in time, calibrating the speed of sound in the fluid in the wellbore;

(d) at the second point in time, transmitting an ultrasonic signal from the transducer and measuring the time of flight for an echo reflected from the boundary of the wellbore fluid and the mudcake back to the transducer; and (e) calculating the change in thickness of the mudcake between the second point in time and the first point in time according to the equation $\Delta L=0.5*(T_{1a}*c_a-T_{1b}*c_b)$, where $\Delta L$ is the change in thickness of the mudcake, $c_a$ is the speed of sound calibrated in step (c), $c_b$ is the speed of sound calibrated in step (a), $T_{1a}$ is the time of flight for an echo reflected from the boundary of the wellbore fluid and the mudcake measured in step (d), and $T_{1b}$ is the time of flight for an echo reflected from the boundary of the wellbore fluid and the mudcake measured in step (b).

48. A process for treating a wellbore, comprising:

subjecting a portion of the wellbore to vibratory waves having a first frequency produced by a first vibratory wave generator;

subjecting substantially the same portion of the wellbore to vibratory waves having a second frequency produced by a second vibratory wave generator;

further comprising subjecting substantially the same portion of the wellbore to vibratory waves having a third frequency produced by a third vibratory wave generator; and further comprising measuring the change in thickness of a mudcake on the interior surface of a wellbore, comprising:

(a) at a first point in time, calibrating the speed of sound in a fluid in the wellbore;

(b) at the first point in time, transmitting an ultrasonic signal from a transducer and measuring the time of flight for an echo reflected from the boundary of the wellbore fluid and the mudcake back to the transducer;

(c) at a second point in time after the first point in time, calibrating the speed of sound in the fluid in the wellbore;

(d) at the second point in time, transmitting an ultrasonic signal from the transducer and measuring the time of flight for an echo reflected from the boundary of the wellbore fluid and the mudcake back to the transducer; and (e) calculating the change in thickness of the mudcake between the second point in time and the first point in time according to the equation $\Delta L=0.5*(T_{1a}*c_a-T_{1b}*c_b)$, where $\Delta L$ is the change in thickness of the mudcake, $c_a$ is the speed of sound calibrated in step (c), $c_b$ is the speed of sound calibrated in step (a), $T_{1a}$ is the time of flight for an echo reflected from the boundary of the wellbore fluid and the mudcake measured in step (d), and $T_{1b}$ is the time of flight for an echo reflected from the boundary of the wellbore fluid and the mudcake measured in step (b).

49. A process for treating a wellbore, comprising:

subjecting a substantially same portion of the wellbore to vibratory waves produced by a plurality of vibratory wave generators;

wherein at least one vibratory wave generator is a vibrating pipe;

wherein the vibrating pipe comprises an inner pipe positioned within an outer pipe and forming a hermetically sealed chamber between the exterior surface of the inner pipe and the interior surface of the outer pipe, and a plurality of drivers attached to the interior surface of the outer pipe;

wherein at least one of the drivers is a transducer; and further comprising measuring the change in thickness of a mudcake on the interior surface of a wellbore, comprising:

(a) at a first point in time, calibrating the speed of sound in a fluid in the wellbore;

(b) at the first point in time, transmitting an ultrasonic signal from the transducer and measuring the time of flight for an echo reflected from the boundary of the wellbore fluid and the mudcake back to the transducer;

(c) at a second point in time after the first point in time, calibrating the speed of sound in the fluid in the wellbore;

(d) at the second point in time, transmitting an ultrasonic signal from the transducer and measuring the time of flight for an echo reflected from the boundary of the wellbore fluid and the mudcake back to the transducer; and (e) calculating the change in thickness of the mudcake between the second point in time and the first point in time according to the equation $\Delta L=0.5*(T_1*c_a-T_{1b}*c_b)$, where $\Delta L$ is the change in thickness of the mudcake, $c_a$ is the speed of sound calibrated in step (c), $c_b$ is the speed of sound calibrated in step (a). $T_{1a}$ is the time of flight for an echo reflected from the boundary of the wellbore fluid and the mudcake measured in step (d), and $T_{1b}$ is the time of flight for an echo reflected from the boundary of the wellbore fluid and the mudcake measured in step (b).

50. A process for treating a wellbore, comprising:
   subjecting a portion of the wellbore to vibratory waves having a first frequency produced by a first vibratory wave generator;
   subjecting substantially the same portion of the wellbore to vibratory waves having a second frequency produced by a second vibratory wave generator;
   wherein the first vibratory wave generator is a vibrating pipe;
   wherein the vibrating pipe comprises an inner pipe positioned within an outer pipe and forming a hermetically sealed chamber between the exterior surface of the inner pipe and the interior surface of the outer pipe, and a plurality of drivers attached to the interior surface of the outer pipe;
   wherein at least one of the drivers is a transducer; and
   further comprising measuring the change in thickness of a mudcake on the interior surface of a wellbore, comprising:
   (a) at a first point in time, calibrating the speed of sound in a fluid in the wellbore;
   (b) at the first point in time, transmitting an ultrasonic signal from the transducer and measuring the time of flight for an echo reflected from the boundary of the wellbore fluid and the mudcake back to the transducer;
   (c) at a second point in time after the first point in time, calibrating the speed of sound in the fluid in the wellbore;
   (d) at the second point in time, transmitting an ultrasonic signal from the transducer and measuring the time of flight for an echo reflected from the boundary of the wellbore fluid and the mudcake back to the transducer; and
   (e) calculating the change in thickness of the mudcake between the second point in time and the first point in time according to the equation $\Delta L=0.5 *(T_{1a}*c_a-T_{1b}*c_b)$, where $\Delta L$ is the change in thickness of the mudcake, $c_a$ is the speed of sound calibrated in step (c), $c_b$ is the speed of sound calibrated in step (a), $T_{1a}$ is the time of flight for an echo reflected from the boundary of the wellbore fluid and the mudcake measured in step (d), and $T_{1b}$ is the time of flight for an echo reflected from the boundary of the wellbore fluid and the mudcake measured in step (b).

51. An apparatus for treating a wellbore to remove contaminant particles therefrom, comprising a tool capable of being deployed down the wellbore and affixed to the tool a first vibratory wave generator for producing vibratory waves having a first frequency and a piston pulser for producing vibratory waves having a second frequency, wherein the piston pulser further comprises a hydraulically actuated control piston connected to a slave piston, the slave piston being in contact with a fluid in the wellbore.

52. The apparatus of claim 51 wherein the first vibratory wave generator is a vibrating pipe.

53. The apparatus of claim 52 wherein the comprises an inner pipe positioned within an outer pipe and forming a hermetically sealed chamber between the exterior surface of the inner pipe and the interior surface of the outer pipe, and a plurality of drivers attached to the interior surface of the outer pipe.

54. The apparatus of claim 53 wherein at least one of the drivers is a transducer.

55. The apparatus of claim 54 wherein the transducer comprises floating piezoelectric stacks.

56. The apparatus of claim 53 further comprising a rotary valve as a third vibratory wave generator for producing vibratory waves having a third frequency.

57. The apparatus of claim 53 further comprising a shear-type valve as a third vibratory wave generator for producing vibratory waves having a third frequency.

58. The apparatus of claim 52 wherein the plurality of vibratory wave generators further comprise a third vibratory wave generator for producing vibratory waves having a third frequency.

59. The apparatus of claim 58 wherein the third vibratory wave generator is a valve.

60. The apparatus of claim 51 wherein the first vibratory wave generator is a valve.

61. The apparatus of claim 51 wherein the first vibratory wave generator is a rotary valve.

62. The apparatus of claim 51 wherein the first vibratory wave generator is a shear-type valve.

63. An apparatus for measuring the thickness of a mudcake on the interior surface of a wellbore, comprising:
   (a) a first transducer for transmitting a tone burst signal in a wellbore fluid and measuring the time of flight of a reflection echo of the tone burst signal across a known distance;
   (b) a second transducer for transmitting an ultrasonic signal, measuring the time of flight for an echo of the ultrasonic signal reflected from the boundary of the wellbore fluid and the mudcake back to the second transducer, and measuring the time of flight for an echo of the ultrasonic signal reflected from the boundary of the mudcake and the interior surface of the wellbore back to the second transducer; and
   (c) a calculator connected to and receiving the measurements from the transducers, the calculator calculating the thickness of the mudcake according to the equation $L=(T_2-T_1)*c/2$, where L is the thickness of the mudcake, c is the speed of sound in the wellbore fluid calibrated from part (a), $T_1$ is the time of flight for an echo reflected from the boundary of the wellbore fluid and the mudcake measured by part (b), and $T_2$ is time of flight for an echo reflected from the boundary of the mudcake and the interior surface of the wellbore measured by part (b).

64. An apparatus for measuring the change in thickness of a mudcake on the interior surface of a wellbore, comprising:
   (a) a first transducer for transmitting a tone burst signal in a wellbore fluid and measuring the time of flight of a reflection echo of the tone burst signal across a known distance at a first point in time and a subsequent second point in time;
   (b) a second transducer for transmitting an ultrasonic signal at the first point in time and measuring the time of flight for an echo of the ultrasonic signal reflected from the boundary of the wellbore fluid and the mudcake back to the second transducer and for transmitting an ultrasonic signal at the second point in time and measuring the time of flight for an echo of the ultrasonic signal reflected from the boundary of wellbore fluid and the mudcake back to the second transducer; and (c) a calculator connected to and receiving the measurements from the transducers, the calculator calculating the change in thickness of the mudcake between the second point in time and the first point in time according to the equation $\Delta L = 0.5*(T_{1a}*c_a - T_{1b}*c_b)$, where $\Delta L$ is the change in thickness of the mudcake, $c_a$ is the speed of sound calibrated from part (a) at the second point in time, $c_b$ is the speed of sound calibrated from part (a) at the first point in time, $T_{1a}$ is the time of flight for an echo reflected from the boundary of the wellbore fluid and the mudcake measured by part (b) at the second point in time, and $T_{1b}$ is the time of flight for an echo reflected from the boundary of the wellbore fluid and the mudcake measured by part (b) at the first point in time.

65. A process for treating a wellbore, comprising:

subjecting a substantially same portion of the wellbore to vibratory waves produced by a plurality of vibratory wave generators;

wherein the vibratory waves have about the same frequency;

wherein the frequencies are modulated; and wherein the frequencies are repeatedly and simultaneous modulated via electrical summing of oval and flexural modes.

66. A process for treating a wellbore, comprising:

subjecting a substantially same portion of the wellbore to vibratory waves produced by a plurality of vibratory wave generators;

wherein the vibratory waves have a plurality of frequencies;

wherein the frequencies are modulated; and wherein the frequencies are repeatedly and simultaneous modulated via electrical summing of oval and flexural modes.

* * * * *